July 5, 1960

R. T. A. HOWELL ET AL 2,944,231

MICROWAVE TRANSMISSION LIMITER

Filed May 8, 1956

United States Patent Office 2,944,231

Patented July 5, 1960

2,944,231

MICROWAVE TRANSMISSION LIMITER

Ronald Thomas Albert Howell and Leo Young, London, England, assignors to The Decca Record Company Limited, London, England, a British company Filed May 8, 1956, Ser. No. 583,385

2 Claims. (Cl. 333—31)

Figure 1:
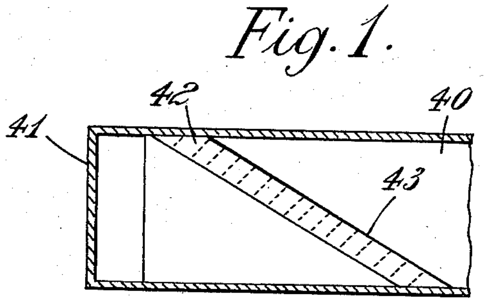

This invention relates to microwave transmission limiters.

The invention makes use of the property that the dielectric constant of certain ceramic dielectric materials, notably the high dielectric constant ceramic materials containing as their principal constituent barium titanate or certain other titanates and containing also certain metallic oxides (to reduce the loss angle at microwave frequencies), can be controlled by an applied electric potential gradient established within the material. For convenience such ceramic materials in which the dielectric constant can be controlled by an applied electric potential gradient will be described hereinafter as dielectric materials of the kind referred to. The dielectric constant of such material depends only on the potential gradient established in the material and is not affected by the direction of that gradient.

Dielectric material of the kind referred to has a dielectric constant dependent on the magnitude and direction of the applied electric field. Such material may, therefore, be disposed in a radio frequency field to provide an output which is non-linear with respect to the incident field.

Dielectric material of the kind referred to may be arranged in a microwave transmission system to produce a phase shift dependent on the magnitude of the incident radio-frequency field. This phase shift may be arranged to control the power transmitted through the system and hence such an arrangement may be employed to limit or select the level of the power transmitted.

According to this invention, a microwave transmission limiter comprises a waveguide having a short-circuited stub with a piece of dielectric material of the kind referred to in said stub, the stub length and position and dimensions of the dielectric material being so chosen that the changes in the dielectric constant due to changes in an incident microwave field fed into said waveguide vary the effective position of the short-circuit to limit the power passing along the wave-guide past said stub.

Since the dielectric loss is non-linear with respect to the amplitude of the input signal, a limiter as described in the preceding paragraph can be used as a device for producing a non-linear characteristic and hence can be employed as a rectifier or a radio frequency mixer or a harmonic generator.

It will in general be necessary to provide matching means for matching the impedance of the part of the apparatus containing the dielectric material to the incident radio frequency field. Many forms of matching devices for use in microwave apparatus are known and suitable constructions to meet any particular requirement will generally be readily apparent. In a tunable cavity or line the matching means may, for example, comprise one or more pieces of material having a dielectric constant of a value or values intermediate between the constants of the regions to be matched. Materials of such dielectric constants may readily be made by powdering the dielectric material of the kind referred to above and mixing it in polyfoam or other suitable diluting plastic material. Only one piece of material with an intermediate dielectric constant might be used but in general better matching will be obtained by employing a graded series of elements arranged in order of their dielectric constants which would be suitably chosen in accordance with the dimensions of the elements.

As is also known, matching in a tunable cavity or line may be effected by shaping dielectric material to have a section which varies along the length of the cavity or line. For example, matching elements may be formed by shaping material in the form of a wedge or inverse wedge for a rectangular cavity or waveguide or in the form of a cone or inverse cone for a cavity or line of circular section. The material to which the electric potential is applied may be shaped in this manner. As previously explained the dielectric constant depends on the potential gradient and thus the constant will only be variable in the region where the applied variable gradient exists and hence the matching means can be formed integrally with the material to which the potential is applied without affecting the performance of the latter. Alternatively, a separate piece of dielectric material, either high constant material of the kind referred to or of lower constant, may be suitably shaped to form a matching device and, if desired, this may be combined with a series of elements having intermediate dielectric constants.

Figure 2:
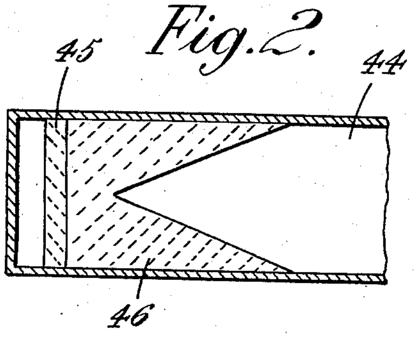
Figure 3:
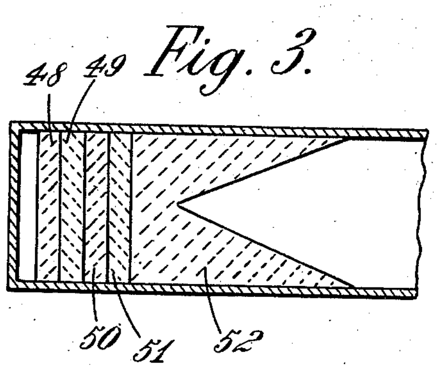
Figure 4:
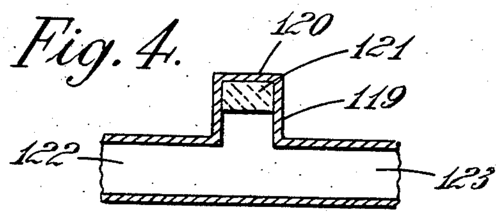

In the following description, reference will be made to the accompanying drawing in which:

Figures 1, 2 and 3 are longitudinal sections through short-circuited waveguides showing various matching arrangements; and Figure 4 is a sectional view of a waveguide with a short-circuited stub arranged to form a limiter.

The dielectric material of the kind referred to has a very high dielectric constant which may be of the order of many thousands, and if this material is put across a waveguide there will almost invariably be a serious mismatch unless steps are taken to match the impedance of the part of the guide containing the dielectric to the remainder of the guide. Such matching may be effected by using known matching techniques such as, for example, the arrangement shown in Figure 1 which shows a length of waveguide 40 terminated in a short-circuit 41 and having a slab of dielectric material 42 of the kind referred to extending across the guide at a point near the short-circuit, the slab sloping in the lengthwise direction of the guide. The face of the dielectric material directed towards the incident radio frequency energy has, in this manner, a sloping surface 43 so that the impedance of the guide gradually changes. In Figure 2 there is shown another construction of short-circuited rectangular waveguide 44 containing a sheet of dielectric material 45, this material being the material of the kind referred to and having a very high dielectric constant. In front of this material there is arranged a matching element formed of material having a dielectric constant which is intermediate between that of the element 45 and that of the unfilled portion of the waveguide 44. This material is shaped as an inverse wedge so as to provide the required gradual change of the impedance along the guide in the direction towards the material 45. As shown in Figure 3, which also shows a short-circuited rectangular waveguide, a sheet 48 of dielectric material of the kind referred to may be arranged across the guide with a series of elements of material having lower dielectric constants arranged in front of it as, for example, the elements 49, 50 and 51. An inverse wedge 52 is provided as the final element of the matching system. In an arrangement such as Figure 3, the dielectric constants of the various elements would be chosen in accordance with the thickness of the various elements and they would be arranged in ascending order towards the element 48. The wedge 52 might be made, for example, of the material known under the Registered Trademark "Distrene." The remaining elements would have to have substantially higher dielectric constants and they may conveniently be made by powdering dielectric material of the kind referred to and mixing the powder in a thermoplastic such as "Polyfoam." Such a process enables material of any desired dielectric constant intermediate between that of the material 48 and that of the basic thermo-plastic material to be readily produced. In the case of circular waveguides, cones or inverse cones would be used for matching instead of wedges or inverse wedges.

In the present invention, use is made of the behaviour of the dielectric material of the kind referred to under the influence of a radio frequency field. Figure 4 shows a block 121 of dielectric material of the kind referred to arranged in a short-circuited stub 119 on a waveguide transmission line 118. If an arrangement such as is illustrated in Figure 4 is employed with a high power signal applied to the input section 122 of the guide 118, the system may be arranged so that the incident field so varies the dielectric constant of the block 121 as to vary the amount of signal transmitted in accordance with the amplitude of the input signal. By suitably positioning the short-circuit 120 the arrangement may be made to act as a limiter which limits the power transmitted to the output section 123 of the waveguide.

We claim:

1. A microwave transmission limiter comprising a waveguide having a laterally disposed short-circuited stub with a piece of dielectric material of the kind in which the dielectric constant depends on an applied electric field in said stub, the stub length and position and dimensions of the dielectric material being so chosen that the changes in dielectric constant due to changes in an incident microwave field fed into said wageguide vary the effective position of the short-circuit to limit the power passing along the waveguide past said stub.

2. A microwave transmission limiter as claimed in claim 1 wherein said dielectric material comprises a ceramic material with barium titanate as its principal constituent.

References Cited in the file of this patent

UNITED STATES PATENTS

| | | |
|---|---|---|
| 2,532,157 | Evans | Nov. 28, 1950 |
| 2,607,031 | Denis et al. | Aug. 12, 1952 |
| 2,722,661 | Walker | Nov. 1, 1955 |
| 2,752,495 | Kroger | June 26, 1956 |
| 2,837,720 | Saltzman | June 3, 1958 |
| 2,856,497 | Rudenberg | Oct. 14, 1958 |